(12) United States Patent
Villis et al.

(10) Patent No.: US 11,582,912 B2
(45) Date of Patent: Feb. 21, 2023

(54) SEPARATOR FOR A GRAPE COLLECTION UNIT

(71) Applicant: AUSSIE WINE GROUP HOLDINGS PTY LTD, Stirling (AU)

(72) Inventors: Malcolm Villis, Woodside (AU); Peter Balnaves, Coonawarra (AU)

(73) Assignee: Aussie Wine Group Holdings Pty Ltd, Stirling (AU)

( * ) Notice: Subject to any disclaimer, the term of this patent is extended or adjusted under 35 U.S.C. 154(b) by 0 days.

(21) Appl. No.: 17/256,772

(22) PCT Filed: Jun. 28, 2019

(86) PCT No.: PCT/AU2019/050692
§ 371 (c)(1),
(2) Date: Dec. 29, 2020

(87) PCT Pub. No.: WO2020/000060
PCT Pub. Date: Jan. 2, 2020

(65) Prior Publication Data
US 2021/0282324 A1    Sep. 16, 2021

(30) Foreign Application Priority Data

Jun. 29, 2018  (AU) ................................ 2018902359

(51) Int. Cl.
*A01D 46/28*  (2006.01)
*A23N 15/02*  (2006.01)

(52) U.S. Cl.
CPC ......... *A01D 46/285* (2013.01); *A23N 15/025* (2013.01)

(58) Field of Classification Search
CPC ...... A01D 46/285; A01D 46/28; A01D 33/08; A01D 17/04; A01D 17/06; A01D 33/02;
(Continued)

(56) References Cited

U.S. PATENT DOCUMENTS 1,899,292 A * 2/1933 Rienks .................. A01D 17/06
209/632
3,581,747 A * 6/1971 Scribner ................ A01D 33/00
460/130

(Continued)

FOREIGN PATENT DOCUMENTS

CN      206658524 U    11/2017
CN      108835684 A *  11/2018
(Continued)

OTHER PUBLICATIONS

Extended Search Report of European Patent Office in Appl'n No. 19825722.2, dated Mar. 7, 2022.

*Primary Examiner* — Thomas B Will
*Assistant Examiner* — Madeline I Runco
(74) *Attorney, Agent, or Firm* — Dentons US LLP

(57) ABSTRACT

The present invention relates to a separator for separating harvested berries from other plant matter. The invention particularly relates to a separator that can be fitted to, positioned above, or integrated with, a collection bin and as such allows for material harvested by an automatic berry harvester to be process prior to deposition of the berries in the collection bin. In particular the berry harvester can be a grape harvester.

18 Claims, 3 Drawing Sheets

(58) Field of Classification Search
CPC ............ A01D 33/04; A01D 17/02–101; A01D 45/28; A01D 45/285; A23N 15/02; A23N 15/025; A23N 2015/006; A23N 2015/008; B65G 2201/0211; B07B 1/14; B07B 1/15; B07B 1/155; B07B 1/10
See application file for complete search history.

(56) References Cited

U.S. PATENT DOCUMENTS

| | | | | |
|---|---|---|---|---|
| 4,029,005 | A * | 6/1977 | Derderian | A23N 15/025 99/639 |
| 5,480,353 | A * | 1/1996 | Garza, Jr. | A01D 45/006 171/27 |
| 6,547,661 | B1 * | 4/2003 | Ferrandez | A23N 15/025 460/144 |
| 6,986,425 | B2 * | 1/2006 | Paladin | B07B 1/15 209/671 |
| 7,166,027 | B2 * | 1/2007 | Messenger | A01D 46/285 460/114 |
| 7,921,628 | B2 * | 4/2011 | Meester | A01D 45/006 56/327.1 |
| 8,123,598 | B2 * | 2/2012 | Berthet | A23N 15/025 460/144 |
| 8,267,256 | B2 * | 9/2012 | Berthet | A23N 15/025 209/667 |
| 8,479,484 | B2 * | 7/2013 | Nakas | A23N 15/02 198/690.2 |
| 8,642,910 | B2 * | 2/2014 | Pellenc | A01D 46/285 209/576 |
| 8,708,153 | B2 * | 4/2014 | Hufford | B07B 1/12 209/352 |
| 8,763,815 | B2 * | 7/2014 | Pellenc | B07B 1/15 209/668 |
| 9,247,768 | B2 * | 2/2016 | Pellenc | A23N 15/025 |
| 9,265,279 | B2 * | 2/2016 | Le Neve | A23N 15/02 |
| 9,452,448 | B2 * | 9/2016 | Dettmer | A01D 33/08 |
| 9,668,417 | B2 * | 6/2017 | Korthuis | B07B 1/10 |
| 9,987,664 | B1 * | 6/2018 | Garabedian | B07B 1/469 |
| 10,124,370 | B2 * | 11/2018 | Pellenc | A01D 46/285 |
| 11,027,313 | B2 * | 6/2021 | Gialis | B07B 1/4636 |
| 2006/0113224 | A1 * | 6/2006 | Williamson | B07B 13/04 209/615 |
| 2006/0270474 | A1 | 11/2006 | Messenger | |
| 2008/0236126 | A1 | 10/2008 | Leonini | |
| 2009/0056297 | A1 | 3/2009 | Pellenc et al. | |
| 2010/0275566 | A1 | 11/2010 | Berthet et al. | |
| 2013/0168297 | A1 * | 7/2013 | Lyman | B07B 9/00 209/234 |
| 2014/0048459 | A1 | 2/2014 | Hufford et al. | |
| 2014/0144118 | A1 | 5/2014 | Le Neve et al. | |
| 2015/0183002 | A1 | 7/2015 | Pellenc et al. | |
| 2015/0208581 | A1 | 7/2015 | Korthuis et al. | |
| 2021/0051851 | A1 * | 2/2021 | Rico | A01D 46/285 |

FOREIGN PATENT DOCUMENTS

| | | | | |
|---|---|---|---|---|
| DE | 4129440 | A1 * | 3/1993 | ............ A01D 46/02 |
| DE | 19617037 | C1 * | 4/1997 | .............. B07B 1/10 |
| EP | 0523365 | A2 * | 1/1993 | |
| EP | 1234618 | B1 * | 7/2004 | .............. B07B 1/10 |
| EP | 2298062 | A1 * | 3/2011 | .......... A01D 46/285 |
| JP | 2001162257 | A * | 6/2001 | |
| KR | 102141668 | B1 * | 8/2020 | |
| WO | 2009016125 | A1 | 2/2009 | |
| WO | 2010040825 | A1 | 4/2010 | |
| WO | WO-2012100311 | A1 * | 8/2012 | ............ A01D 46/06 |
| WO | 2017027912 | A1 | 2/2017 | |
| WO | 2017-080893 | | 5/2017 | |

\* cited by examiner

Figure 4
Figure 5
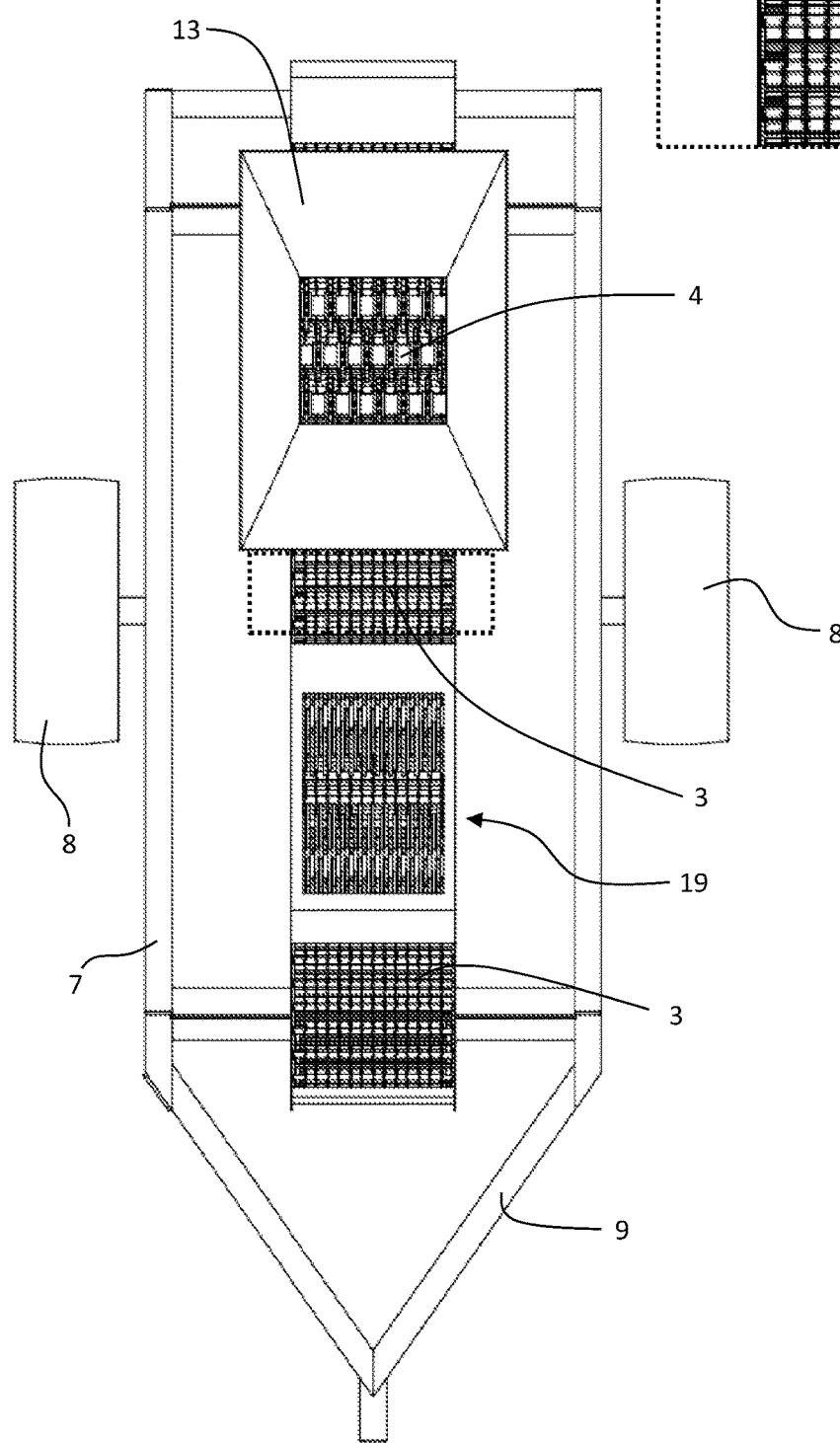
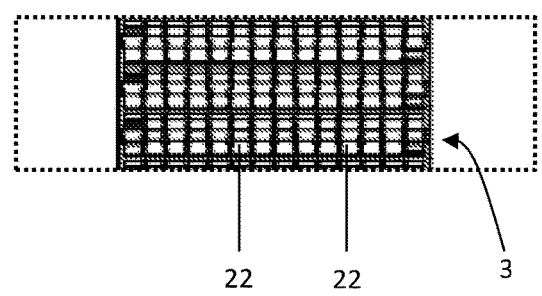

SEPARATOR FOR A GRAPE COLLECTION UNIT

PRIORITY CLAIM

This application is a National Stage Application of International Application No. PCT/AU2019/050692 filed on Jun. 28, 2019, which claims priority to Australian provisional application number 2018902359 entitled "SEPARATOR FOR A GRAPE COLLECTION UNIT" filed on 29 Jun. 2018, the entire contents of which are herein incorporated by way of this reference.

TECHNICAL FIELD

The present invention relates to an apparatus for sorting mechanically harvested berries to remove contaminating matter from the berries. Particularly, the apparatus is configured to be fitted to a collection unit for berries such as a trailer bin or chaser bin, for collection of grapes.

The invention also relates to collection units including an apparatus for separating berries and contaminating matter during harvesting.

BACKGROUND OF INVENTION

Traditionally, berries such as grapes were harvested by hand. However, as technology has improved, driven by the need to increase the speed of harvesting and decrease the cost, the process for harvesting berries has become increasingly automated. The most commonly used mechanical berry harvesters are grape harvesters. Mechanical grape harvesters are used throughout the world to rapidly remove grapes from grape vines during vintage. Problematically, however, mechanical grape harvesters also remove matter other than grapes (MOG). Such contaminating matter is undesirable in the harvested grapes and if not removed can lead to significant alterations in the flavour of wine produced from grapes. This is particularly important when producing red wine whereby the grape juice is fermented together with the skin (and any contaminating matter) for a prolonged period of time.

Consequently, wineries typically grade all grapes that are provided from vineyards based on the level of MOG contamination and will pay less for grapes that have a high percent of contaminating matter. In some instances, wineries will reject grapes that have too much contamination. As a result, mechanical grape harvesters are operated in a manner that aims to reduce the concentration of contamination in harvested grapes. One such way to reduce contamination is to operate the harvester at a slower speed. However, this is undesirable as it increases the cost of harvesting the grapes and may offset any value added to the grapes by decreasing contamination.

Mechanical grape harvesting machines generally work by providing a channel through which grape vines can be passed as the mechanical harvester moves along a row of grape vines. The harvesters have a harvesting head that sits either side of the vines and vibrates in a lateral direction thereby laterally shaking the vines. As a result, grapes fall from the vines and are collected by the mechanical harvester and fed by a conveyor system to one or more outlets. Typically, a mechanical grape harvesting machine will have two outlets positioned toward either side of the harvesting machine that are provided with berries by two independent conveyor systems. These outlets either directly deposit the harvested grapes into a collection unit, or the grapes are deposited on a further conveyor system which transports the grapes to a discharge conveyor that extends to one side of the harvesting machine, or the rear of the harvesting machine, and then deposits the harvested grapes into a "chaser" or trailing collection unit which are transported alongside or behind the harvester.

In order to allow for the mechanical harvesters to operate at increased speed and reduce the level of contaminating matter in the harvested grapes, devices for the removal of contaminants and waste plant matter have been developed. These devices can generally be categorised into two groups; firstly, devices that remove contaminants after harvesting and collection (and prior to fermentation); and secondly devices fitted to the harvesters themselves that remove contaminants during harvesting.

Problematically, however, once the grapes are provided to a winery, the grapes will be assessed for contamination, and any penalties will be imposed. Therefore, it is preferable to utilise devices fitted to the harvesters to remove contaminants prior to delivery to the winery.

Indeed, there are several such devices that have been developed for this purpose. The most primitive form of such contamination removal devices are air fans. Typically, multiple fans are positioned above the conveyor paths that transports harvested grapes to a collection unit. These fans create a vacuum above the grapes as they are transported under the fans. The vacuum sucks up some of the contaminating matter, such as leaves, into the fans which then discharges the matter from the harvester. However, such fans have limited capacity and efficacy. Consequently, more complex berry separating systems, that can be integrated in mechanical grape harvesters, have been developed. These include systems by Braud™, Gregoire™ and Pellenc™, who each provide different system for separating grapes from contaminating material.

All of the above systems are fitted to a berry harvester. Therefore, these systems need to be either integrated into the harvester during construction, or retrofitted to an existing harvester, which can be difficult and expensive. Furthermore, it is in the interest of the vineyard to produce harvested grapes which are substantially free of contaminating matter. However, very few vineyards own and operate their own mechanical harvesters. Rather most vineyards rent or lease harvesters or contract their harvesting to third party contractors. As such, they have little control over the type of harvester used, and if separating mechanisms are attached to the harvester.

Consequently, there is a need for an apparatus for separating harvested berries, such as grapes, from waste material, which can separate contaminants from harvested berries prior to delivery to a winery and can be utilised in the harvesting process without excessive effort or expense.

It is to be understood that the discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF INVENTION

The present invention provides an apparatus, configured to be fitted to a collection unit, for separating berries from other plant matter from harvested plant material, the apparatus comprising a first separating conveyor system comprising an array of rollers, rotatable to convey harvested plant material in an upstream to downstream direction, the rollers spaced apart to provide a plurality of openings therebetween permitting the transit of separated berries therethrough while preventing the transit of other plant matter; and a second separating conveyor system, positioned below the first separating conveyor, for conveying harvested plant material in an upstream to downstream direction, the second conveyor system including a plurality of openings configured to permit the transit of berries therethrough while retaining other plant matter on the conveyor, wherein the first and second separating conveyor systems are arranged such that berries and other plant matter from the first conveyor system are deposited onto the second conveyor system.

Collection units, unlike mechanical harvesters, are often owned by the property from which the berries are harvested, such as a vineyard. Therefore, a property owner, who directly benefits from increased returns that result from lower contamination levels in harvested berries, can fit the apparatus to their collection units, and can purify the harvested berries irrespective of the mechanical harvester used. This provides greater flexibility to the property owner and allows them to decrease the likelihood of being penalised for elevated contamination levels in their harvested berries.

Furthermore, the apparatus of the present invention can be retrofitted to a collection unit, without substantial modification of the unit. This is not possible when similar devices are retrofitted to mechanical harvesters, which require considerable modification to integrate such separators. Such simplified modification results in decreased costs for fitting the present apparatus compared separating systems designed for mechanical harvesters.

As such, in embodiments of the present invention the apparatus for separating berries from other plant matter from harvested plant material is fitted to a collection unit, wherein the collection unit is not integrated, or a component of, a mechanical harvester. In some embodiments, the collection unit is a trailing collection unit, and/or does not form part of a harvesting apparatus nor is it integrated with a vehicle for harvesting. In some embodiments, the collection unit is a detachable and towable collection unit.

In some aspects, the invention provides a collection unit having a separating apparatus. In some embodiments, the collection unit is provided by a collection bin on a collection trailer. In this form, the collection unit may be known as a trailer bin or a chaser bin.

In some embodiments, the apparatus is hydraulically powered. In some embodiments, the hydraulic power is provided by a hydraulic pump separate to the collection unit. In some embodiments, the hydraulic pump is part of a vehicle towing the collecting unit. In some embodiments, the hydraulic pump is provided by a tractor, truck or other vehicle towing the collection unit.

Any suitable collection unit is envisaged to be used in accordance with the present invention. In some embodiments, the collection unit is an open top collection unit, and the apparatus is fitted above the open top of the collection unit. In these embodiments, separated berries fall into the collection unit from the apparatus. In some embodiments the berries fall directly into the collection unit from the apparatus.

Typically, two types of towable collections units are used in combination with mechanical harvesters. The first type are referred to as tailer bins, or chaser bins, which are towed beside the grape harvester (typically by a tractor). These collection units normally have removable, relatively small, collection bins mounted, or positioned, on a frame. Once full, the collection bins can be removed and left behind for processing of the berries. In the field of winemaking this has the advantage that the grape are minimally disturbed, and aeration is reduced, so unwanted juice production and fermentation in the collection bins is minimised. The second type of commonly used, open top, collection unit is referred to as a gondola. A gondola is typically used for bulk harvests (e.g. 3 to 7 tonnes) and comprises a large tippable bin towed on a heavy duty chassis by a vehicle such as a tractor. Once full, the gondola can tip the harvested berries into a truck which transports them to a processing facility, such as a winery, or the gondola can transport the berries to the processing facility itself. Both of these common types of collection units are envisaged to be used in embodiments of the present invention By providing a first separating conveyor system above the second, berries separated by the first separating conveyor system can be fed to the second separating conveyor system for further separation. Furthermore, other matter, which may include berries still attached to stalks or in bunches, can be fed from the first separating conveyor system, to the second separating conveyor system, whereby they can be further separated, or transported to the a de-stemming unit (see below). The second separating conveyor system, alone or in combination with a de-stemming unit, can then transport other plant matter away from the collection unit for disposal.

In some embodiments, the first separating conveyor system is positioned at, or near, the upstream end of the second separating conveyor system. In some embodiments, the first separating conveyor extends along a portion of the second separating conveyor system.

The vertical arrangement of the two separating conveyor systems allows for increased area to separate the berries (such as grapes) from the other plant matter, which is important given the restricted space of a collection unit. Further, in some embodiments, the second separating conveyor is positioned above the collection unit such that berries passing through the openings fall into the collection unit without the need for additional conveying.

In some embodiments, the array of rollers of the first separating conveyor systems is provided by a series of shafts, each shaft provided with a plurality of spaced apart radially-extending rollers, wherein the shafts are spaced along a plane at an orientation and distance relative to one or more adjacent shafts such that a radially-extending roller on a shaft extends into a space provided between two adjacent radially-extending rollers on an adjacent shaft to provide an array of rollers and a plurality of openings.

In some forms of the above embodiments, the radially-extending rollers are provided by multiple projections radially-extending from the shaft to define the roller, wherein the radially-extending rollers are disposed perpendicular to the shaft.

The radially-extending projections can take any form, and be formed of any suitable material. However, in some embodiments the radially-extending projections extend from the shaft in an arc away from the direction of rotation of the radially-extending rollers. Such an arrangement is referred to as a 'star wheel'. Preferred materials for formation of the radially-extending projections include flexible polymers such as rubber, or other suitable food safe synthetic or natural polymers.

It has been recognised by the Inventors that the separation of berries from other plant matter is improved when the first conveyor system is provided at an inclined angle. This increases the retention time of the harvested plant material on the rollers, as well as the travel length of the first separating conveyor system. Consequently, in some preferred embodiments the first separating conveyor systems is inclined at an angle of 10 and 30 degrees relative to horizontal, or 15 to 25 degrees relative to horizontal, or 18 to 22 degrees relative to horizontal, or relative to the plane of the second separating conveyor system. In some embodiments the first separating conveyor system is inclined at an angle of about 20 degrees relative to horizontal, or relative to the plane of the second separating conveyor system.

The second separating conveyor system can be provided by any suitable conveying system that includes a plurality of openings for berries to pass through while retaining and conveying larger matter.

In some embodiments, the second separating conveyor system is provided by a mesh or grate providing the plurality of openings. Movement of the mesh or grate can be provided by any suitable means, however in a preferred form the mesh or grate is provided by a continuous belt mounted to rotate around upstream and downstream shafts. In some embodiments, the second separating conveyor system is provided by a mesh providing the plurality of openings, wherein the mesh is a continuous mesh belt mounted to rotate around upstream and downstream shafts.

The orientation of the direction of travel of the first and second separating conveyor systems, relative to each other, can be any suitable orientation, such that plant material conveyed along the first separating conveyor is deposited onto the second separating conveyor for further separation. In some embodiments, the longitudinal axes of the first and second separating conveyor systems are substantially parallel. In these embodiments, the direction of travel of the first and second separating conveyors can the unidirectional (the upstream to downstream direction is in the same orientation) or can be in opposing directions (the upstream to downstream direction of the first separating conveyor is opposite to the second).

In some embodiments of the apparatus of the present invention, when fitted to a collection unit, the downstream end of the second separating conveyor system extends beyond the collection unit thereby transporting other plant matter beyond the collection unit. The other plant matter can then be disposed of. In some embodiments, the other plant matter is disposed of by depositing the matter on the ground. Alternative waste matter collection systems may be used.

In some embodiments of the apparatus of the present invention, when fitted to a collection unit, the first and second separating conveyor systems are positioned vertically above the collection unit such that berries, which transit through the openings of the second separating conveyor system, are collected in the collection unit. Advantageously, in these embodiments, the apparatus is simplified such that it does not require any additional active transportation means for directing the separated berries into the collection unit. In a preferred embodiment, when fitted to the collection unit, the second separating conveyor system of the apparatus sits above the collection unit. Consequently, separated berries fall directly into the collection unit from the second separating conveyor system.

Therefore, in at least some embodiments, the apparatus, when fitted to a collection unit, is configured such that the second separating conveyor system is positioned above a collection unit and the first separating conveyor system is positioned above the second separating conveyor, such that berried or other matter that passes through the first separating conveyor system can interact with, the second separating conveyor system.

In some embodiments, both the first and second separating conveyor systems are positioned above each other in a vertical axially aligned arrangement above the collection unit, such that berries that pass through the second and first separating conveyor systems are collected in the collection unit.

Berries can be provided to the first separating conveyor system of the apparatus by any suitable means. Typically, a mechanical harvester has a discharge arm which is positioned to the side or rearward of the mechanical harvester. As such, the discharge arm can direct harvested plant material onto the upstream end of the first separating conveyor system, which is subsequently transported to the downstream end of the first separating conveyor system and onto the second separating conveyor system. However, due to movement of the mechanical harvester relative to the collection unit, which is not integrated with the mechanical harvester, it may be difficult to accurately deposit harvested plant material onto the upstream end of the first separating conveyor. Therefore, the apparatus of the present invention may further comprise a hopper for receiving harvested plant material and directing it to an upstream end of the first separating conveyor system. In some embodiments, the hopper is provided by an inverted frustum shaped funnel.

The harvested plant matter deposited onto the first separating conveyor system is substantially separated into berries and other plant matter by the rotating rollers of the first separating conveyor system. However, some berries may still be attached to other plant matter, such as stalks, when they are deposited onto the second separating conveyor system. Therefore, in some embodiments, the apparatus of the present invention further comprises a de-stemming unit. The de-stemming unit assists in further separating the berries from the other plant matter.

De-stemming units can puncture berries during the process of de-stemming and therefore release the juice from the berries. In hot conditions this juice can begin to ferment while in the collection unit which is undesirable. Therefore, to minimise the number of berries that feed into the de-stemming unit, in some embodiments, the de-stemming unit is positioned at or near the downstream end of the second separating conveyor. This results in only the minimal amount of berries entering the de-stemming unit as the majority of separated berries have already passed through the first and second separating conveyor systems.

De-stemming units suitable for use with the apparatus of the present invention are known in the art. However, in some embodiments, the de-stemming unit is provided by a series of rotating fingers provided on a shaft, which rotate to dislodge the berries from other plant matter. In some embodiments, the rotating fingers of the de-stemming unit are positioned above the second separating conveyor and rotate in a direction opposite the travel of plant material on the second separating conveyor.

An alternative de-stemming unit includes a rotatable cylinder having a plurality of apertures configured to permit berries to pass through. The cylinder has a coaxial shaft which extends along at least a portion of the length of the cylinder, the shaft having a plurality of projecting members that radially extend toward the periphery of the cylinder. The radially-extending projecting members are arranged to form a helix, such that when the shaft is rotated the projecting members direct waste along the length of the cylinder and propel waste matter out of an open end of the cylinder, opposite the end to which the waste matter was provided. In this embodiment, the cylinder of the de-stemmer would be positioned above the collection unit, such that berries that pass through the apertures are collected in the collection unit.

As previously mentioned, the present invention provides a collection unit having a separating apparatus as describe above. In some embodiments, the collection unit includes a frame, a collection bin, and an apparatus for separating berries from other plant matter from harvested plant material as describe above, wherein the apparatus is mounted above the collection bin. In some embodiments, the apparatus is mounted to the frame. In some embodiments, the collection unit I stowed by the harvester.

In some embodiments, the collection unit is a trailing collecting unit to be towed in coordination with an operating mechanical harvester. In some embodiments, the collection unit is a chaser bin or a gondola to be towed by another vehicle alongside the mechanical harvester. Suitable vehicles include tractors.

In some embodiments of the collecting unit of the present invention, the apparatus is mounted to extend longitudinally along the collection unit. In some embodiments, the downstream end of the second separating conveyor system extends beyond the periphery of the unit; thereby other plant matter is transported beyond the collection unit for disposal.

The collection unit of the present invention is separate to the mechanical harvester. However, the second and first separating conveyor systems need to be powered for operation. As such, in some embodiments, the first and second separating conveyor systems are powered by hydraulics. In some embodiments, the hydraulic power is provided by a hydraulic pump separate to the collection trailer. In some embodiments, the hydraulic pump is provided on the vehicle towing the collection unit, and the collection unit is in fluid communication with the hydraulic pump.

In preferred embodiments of the invention, the berries are grapes and the other plant matter is material other than grapes (MOG). As would be understood MOG includes, but is not limited to: leaves, petioles, stalks, canes, wood, non-vine plant matter (e.g. leaves from surrounding trees), pests (e.g. snails, caterpillars, rodents) and foreign objects (e.g. irrigation parts, trellis parts and debris).

BRIEF DESCRIPTION OF DRAWINGS

The invention is further illustrated in the following embodiments described with reference to the accompanying drawings. The drawings are for the purpose of describing particular embodiments only, and are not intended to be limiting with respect to the above description.

FIG. 4 is a top view of a collection unit having an apparatus in accordance with an embodiment of the invention.

FIG. 5 is an enlarged view of the mesh belt providing the second separating conveyor in accordance with an embodiment of the invention.

DETAILED DESCRIPTION

The above invention will be described in more detail by way of one embodiment adapted to separate material other than grapes (MOG) from harvested grapes. As is to be understood the present invention can be used with other fruit, with some degree of modification to the elements of the invention, without parting from the ambit of the invention. For example sizing of openings and components may need to be modified to permit use with other fruit, or indeed for specific varieties of grapes, and that these modifications can be reasonably foreseen and implemented by a person skilled in the art without significant or undue burden, in light of the disclosures within this application.

Figure 1:
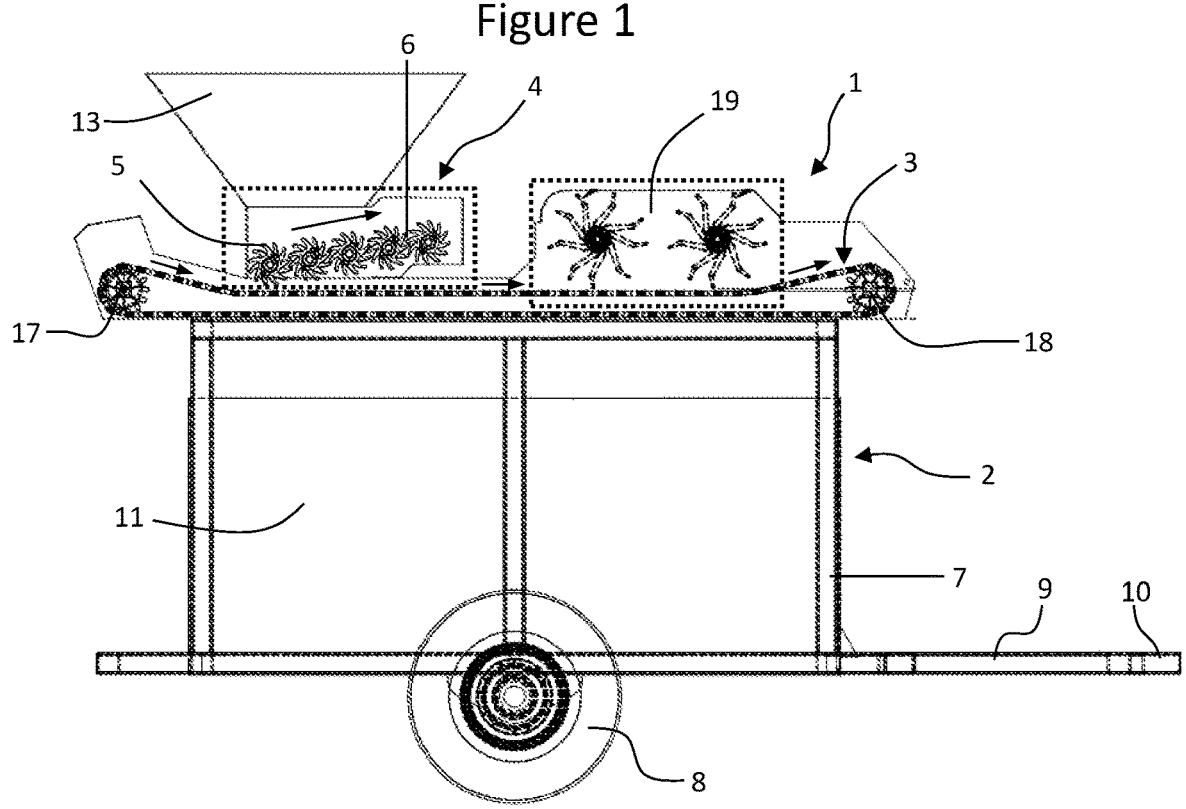
FIG. 1 is a side view of a collection unit having an apparatus in accordance with an embodiment of the invention.

In an embodiment of the invention illustrated in FIG. 1, there is provided an apparatus (1), configured to be fitted to a collection unit (2), for separating berries, from other plant matter from harvested plant material, the apparatus (1) comprising a first separating conveyor system (4) comprising an array of rollers (5), rotatable to convey harvested plant material in an upstream to downstream direction (see arrow), the rollers (5) spaced apart to provide a plurality of openings (6) therebetween permitting the transit of separated berries therethrough while preventing the transit of other plant matter; and a second separating conveyor system (3), positioned below the first separating conveyor system (4), for conveying harvested plant material in an upstream to downstream direction (see arrow), the second conveyor system (3) including a plurality of openings (22—see FIG. 5) configured to permit the transit of berries therethrough while retaining other plant matter on the conveyor, wherein the first (4) and second (3) separating conveyor systems are arranged such that berries and other plant matter from the first conveyor system (4) are deposited onto the second conveyor system (4).

In the embodiment illustrated in the Figures, the apparatus (1) is fitted to a collection unit (2) comprising a frame (7), provided with two wheels (8), a drawbar (9) and a coupler (10) to provide a collection trailer. The collection trailer supports a collection bin (11) which comprises a water impermeable material of sufficient rigidity to retain harvested berries and any juice produced during harvesting. Alternative collection units are known in the art and include tippable unitary bins, wherein the frame is integrally formed with panels defining the collection bin, and trailer frames wherein one or multiple removable collection bins can be positioned. The collection unit illustrated in the Figures is not intended to limit the application of the apparatus of the present invention; rather it illustrates one possible configuration of a collection unit upon which the apparatus of the invention can be fitted.

In the embodiment illustrated in the Figures, the apparatus (1) is fitted to upper crossbars (12—see FIG. 6) provided by the frame (7) of the collection unit (2), wherein connectors (not shown) are used to secure the apparatus. In this configuration the apparatus (1) may be removable from the collection unit (2) and fitted to a second collection unit (not shown). Therefore, in some embodiments, the apparatus (1) includes mounting means (not shown) for connection of the apparatus to the collection unit (2). Suitable mounting means are known in the art and may include, but are not limited to, a boss attached to the frame (7) of the collection unit (2), which can engage the apparatus (1) and be fixed thereto by any suitable means (such as by way of threaded bolt). Alternatively, the opposing arrangement can be provided.

Alternative means are envisaged for fitting the apparatus (1) to a collection unit (2), including permanent integration with the collection unit (2). When fitter to a collection unit (2) the apparatus (1) of the invention provides a trailing collection unit, including a frame (7), a collection bin (11), and an apparatus (1) for separating berries from other plant matter from harvested plant material as describe herein, wherein the apparatus (1) is mounted above the collection bin.

Importantly, providing the apparatus (1) on a trailing collection unit (2) separates the apparatus (1) from a mechanical harvester. Therefore, the use of the apparatus (1) is independent of the type of harvester used and its implementation can be controlled by the owner of the property from which the berries are being harvested (for example a vineyard).

The trailing collection unit (2) can be mounted to any suitable vehicle to be towed in tandem with a mechanical harvester. In some embodiments, the trailing collection unit (2) including the apparatus (1) can be towed by a second vehicle, such as a tractor, alongside the mechanical harvester. To facilitate the accurate deposition of harvested plant material onto the first separating conveyor (4) of the apparatus (1), the apparatus (1) may include a hopper (13), provided by a downwardly tapering, or narrowing, structure (such as an inverted frustum) which presents an enlarged opening for receiving harvested plant material, and then directing the material to an upstream portion of the first separating conveyor (4).

Figure 2:
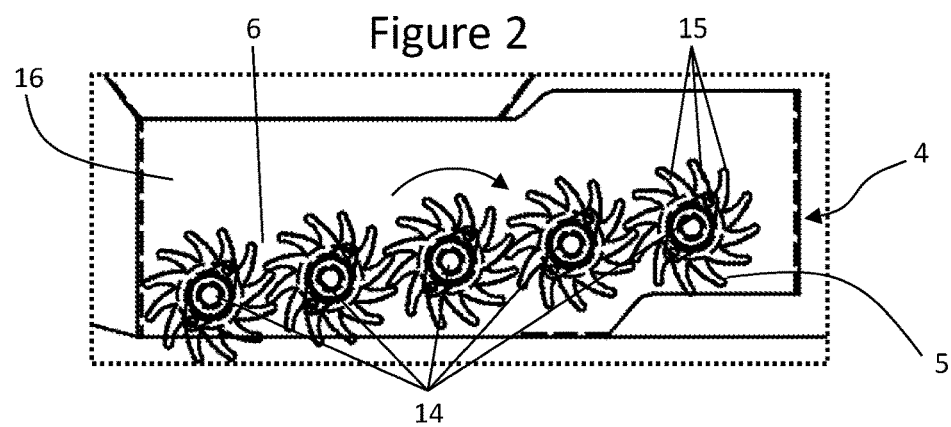
FIG. 2 is an enlarged view of the first separating conveyor system illustrated in FIG. 1.

The illustrated embodiment of the first separator conveyor system (4) illustrated in FIG. 2 (being an enlargement of a portion of FIG. 1 indicated by the dotted boundary) is provided by a series of 5 shafts (14), each shaft (14) provided with a plurality of spaced apart radially-extending rollers (5), wherein the shafts (4) are spaced along an inclined plane at an orientation and distance relative to one or more adjacent shaft(s) (14) such that a radially-extending roller (5) on a shaft (14) extends into a space provided between two adjacent radially-extending rollers (5) on an adjacent shaft (14) to provide an array of rollers and a plurality of openings (6).

The radially-extending rollers (5) of the illustrated embodiment are provided by multiple projections (15) radially-extending from a shaft (14) to define the roller (5), wherein the rollers (5) are disposed perpendicular to the shaft (14). Each of the radially-extending projections (15) extends from the shaft (14) in an arc away from the direction of rotation (see arrow) of the rollers (5), to provide a 'star wheel'. The radially-extending projections (15) are preferably made out of flexible material, such as a flexible polymer like rubber. However, other suitable food safe materials can be used. While star wheels are used in the illustrated embodiment of the invention, other suitable roller may be attached to the shafts (14) to provide the required openings (6) through which berries can pass. Additional means for providing separating conveyor systems are known in the art such as the Selectiv' Process Winery™ table by Pellenc™ which provides a series of parallel rollers which oscillate in thickness along their length such that gaps are provided between the rollers for berries to pass through, while waste plant matter is retained and rolled off the table. Alternative suitable separating conveyors to provide the first separating conveyor system (4) may include a series of rollers, arranged on parallel shafts to form a bed, wherein each rollers provides a semicircular concavity which in cooperation with rollers on an adjacent shaft provide a series of openings for transit of berries therethrough, while large matter is retained and transported by rotation of the rollers.

In some embodiments, the distance provided between adjacent rollers (5) on the same shaft (14) is between 30 mm and 60 mm, preferably between 40 mm and 50 mm, or more preferably the distance is approximately 45 mm. As will be understood, the space between the rollers (5) may need to be adjusted depending on the berries being picked. Therefore, in some embodiments the distance provided between adjacent rollers (5) on the same shaft can be adjusted. In some embodiments, the first separator conveyor system (4) includes a mechanism for adjusting the distance provided between adjacent rollers (5) on the same shaft (14).

In some embodiments, each shaft (14) is provided with between 3 and 9 rollers (5), in some embodiments, each shaft (14) is provided with between 5 and 7 rollers (5). In some embodiments, each shaft (14) is provided with 6 rollers (5).

In some embodiments, each shaft (14) is positioned between 200 mm and 100 mm apart, preferably 180 mm to 120 mm apart, or 165 mm to 135 mm apart. In yet a further embodiment, the shafts (14) are spaced approximately 150 mm apart on the frame (16). As will be understood the distance between the shafts (14) may be altered when there is a need to use small or larger rollers (5). Furthermore, the distance between the shafts (14) may be altered if the incline of the first separating conveyor is increased or decreased.

In some embodiments, each roller (5) has a cross-sectional length of between 200 mm and 120 mm, preferably 180 mm to 140 mm. In yet a further preferred embodiment, the length of the roller (5) is 160 mm. In embodiments wherein the rollers (5) have a circular cross section, the diameter of the roller (5) will be 160 mm. However, as will be understood the cross-sectional length of the rollers (5) can be altered to optimize the performance of the separating conveyor systems (1). Such alterations may be made in consideration of the berries to be separated.

In some embodiments, the width of the rollers (5) is between 16 mm and 10 mm, preferably between 14 mm and 12 mm. In some embodiments, the width of the rollers (5) is approximately 13 mm. As will be understood, the width of the rollers (5) can be altered to optimize the performance of the first separating conveyor system, and may be altered depending on the spacing between adjacent rollers (5) on the same shaft (14).

The shafts (14) are mounted to a frame (16), which securely locate the shafts (14) to permit rotational movement (see curved arrow in FIG. 2), without translational movement. As illustrated, in a preferred orientation the plane defined by the series of shafts (14) is inclined relating to horizontal or relative to the second separating conveyor system (3). The preferred incline of the first separating conveyor system (4) can be influenced by the type of grapes or berry being processed, however in in the illustrated embodiment the incline is at an angle of about 20 degrees, relative to horizontal or the second separating conveyor system (3). It may be desirable to include a mechanism for adjusting the incline of the first separating conveyor system (4) such that the angle is maintained at 20 degrees relative to level when the collection unit (2), upon which the apparatus (1) is fitted, changes angle.

The second separating conveyor system (3) can be any suitable system provided that it includes a series of openings size (22) to permit transit therethrough of separated berries, while retaining other plant matter on top of the conveyor. In the embodiment illustrated in the Figures, the second separating conveyor system (3) is provided by a continuous mesh belt providing the plurality of openings (22—see FIGS. 4 and 5). The mesh belt mounted to rotate around an upstream shaft (17) and a downstream shaft (18), which rotate to move the upper surface of the mesh belt in an upstream to downstream direction (see arrow in FIG. 1), thereby transporting matter in the same direction.

Alternative means for providing the second separating conveyor system (3) include an array of rollers, such as those described herein, a continuous grate belt provided by a series of parallel bars interlined by flexible connectors, the belt rotated around a first and second shaft, or a vibrating mesh which is angled to direct other plant matter in a predefined direction and away from the collection unit.

The terms "upstream" and downstream" as used throughout this specification are not intended to be references to height or elevation of relative ends of the separating conveyor systems (3,4). Rather the terms are intended to indicate the direction of movement of matter on the conveyor systems.

In the embodiment of the apparatus (1) illustrated in the Figures, when fitted to a collection unit (2), the downstream end of the second separating conveyor system (3) extends beyond the collection bin (11), thereby transporting other plant matter retained on the second separating conveyor (3) beyond the collection unit (2). Typically, this other plant matter is deposited onto the ground as the collection unit (2) moves along. However, a waste collection and disposal system (not shown) can be fitted to collect any waste plant matter.

In the illustrated embodiment, the first (4) and second (3) separating conveyor systems (when the apparatus (1) is fitted to a collection unit (2)), are positioned vertically above the collection unit (2) such that berries which transit through the openings (6 and 22) are collected in the collection unit (2). In the illustrated embodiment, the second conveyor system (3) sits directly above the collection unit (2). Such an arrangement simplifies the apparatus (1) and removes a requirement for additional transportation means, such as conveyors or chutes for moving the berries form one conveyor system to another.

Figure 6:
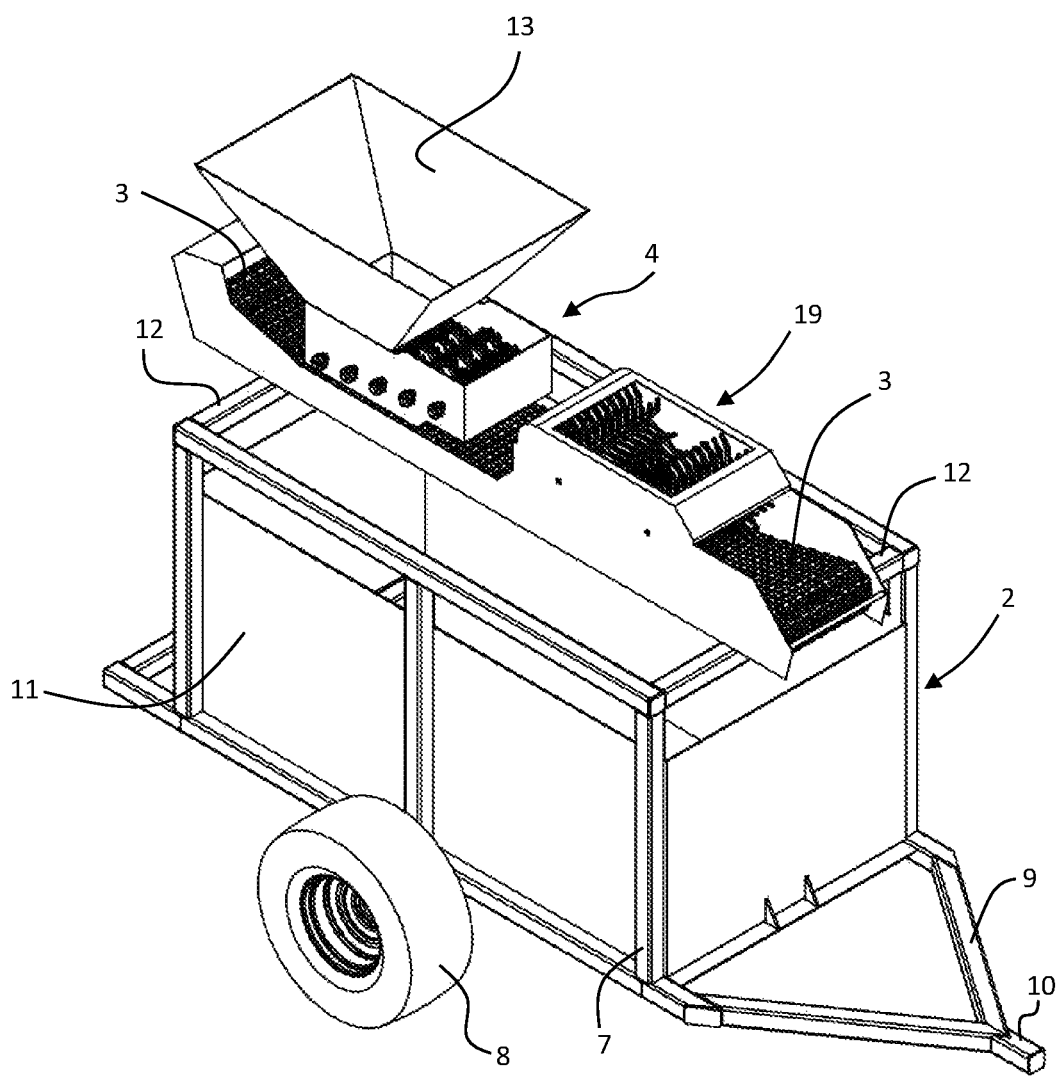
FIG. 6 is a perspective view of a collection unit having an apparatus in accordance with an embodiment of the invention.

As illustrated in the FIGS. 4 and 6 the longitudinal axes of the first and second separating conveyor systems are substantially parallel to each other, with the first conveyor system positioned above the second. When viewed from an upper view, the longitudinal axis, and the direction of travel or the first (4) and second (3) separating conveyor systems are vertically axially aligned.

As will be appreciated, the first (4) and second (3) separating conveyor systems of the apparatus (1) may be oriented relative to each other in any suitable manner. For example the direction of travel of the first (4) and second (3) separating conveyor systems may be in the same direction, or in opposing directions. Further the direction of travel of the first (4) and second (3) separating conveyor systems may be perpendicular to each other, so long as other plant material is deposited from the first conveyor system (4) on to the second separating conveyor system (3). However, it is to be understood that it is advantageous for the first (4) and second (3) conveyor systems to be oriented such that berries passing through the first conveyor system (4) are deposited on the second conveyor system (3).

The rollers (5) of the second separating conveyor system (4) substantially act to remove berries which are still attached to other plant matter. However, some berries may still be deposited onto the second conveyor system (3) attached to other plant matter, or still in bunches. Therefore, in the illustrated embodiment, the apparatus (1), further comprises a de-stemming unit (19).

Figure 3:
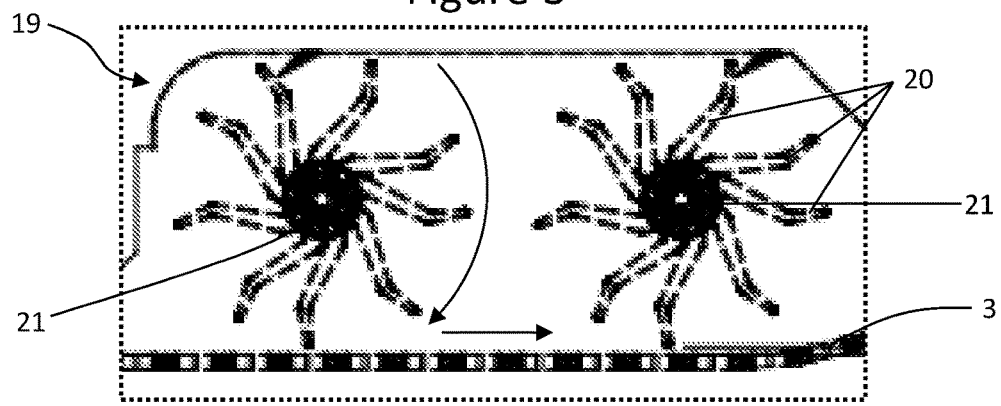
FIG. 3 is an enlarged view of the de-stemmer illustrated in FIG. 1.

De-stemming units (19) are known in the art and act to remove the stems still attached to berries. In the illustrated embodiment, the de-stemming unit (19—illustrated in FIG. 3, which is an enlarged view of a portion of FIG. 1) is provided by a series of rotating fingers (20), provided on a shaft (21), which rotate to dislodge berries from other plant matter transported on the second separating conveyor system (3). Dislodged berries then pass through the openings (22) in the second separating conveyor system (3) and are collected in the collecting unit (2). The de-stemming unit (19) is positioned at or near the downstream end of the second separating conveyor system (3), with the rotating fingers (20) positioned above the second separating conveyor system (3) and rotate (see arrow) in the same direction as the rotational direction of the second separating conveyor system (3) resulting in the rotating fingers traveling in a direction above the second separating conveyor system (3) counter to the direction of material carried on the surface of the second separating conveyor system (3).

Alternative de-stemmers are known in the art and can be included in the apparatus (1) of the present invention. One non-limiting example of a de-stemming unit suitable for use in the present invention may comprise a rotatable cylinder having a plurality of apertures configured to permit berries to pass through. The cylinder has a coaxial shaft which extends along at least a portion of the length of the cylinder, the shaft having a plurality of projecting members that radially extend toward the periphery of the cylinder. The radially-extending projecting members are arranged to form a helix, such that when the shaft is rotated the projecting members direct waste along the length of the cylinder and will propel waste matter out of an open end of the cylinder. In this embodiment, the cylinder of the de-stemmer would be positioned above the collection unit, such that berries that pass through the apertures are collected in the collection unit.

Operation of the apparatus (1) of the present invention requires movement of the first (4) and second (3) separating conveyor systems, as well as the de-stemmer (19). Consequently, the apparatus (1) of the present invention needs a supply of power. Any suitable power supply, which can provide rotational movement of the shafts (14, 17, 18, 21), can be used with the present invention. For example the movement of the shafts (14, 17, 18, 21) may be effected by electrical motors connected to a suitable electrical power source. However, a preferred and convenient source of power is hydraulic power. The majority of tractors, or other vehicles suitable for towing the collection unit (2) of the present invention, include hydraulic pumps which can be used to provide hydraulic power to the apparatus (1) of the present invention. Therefore, in some embodiments, the first (4) and second (3) separating conveyor systems are driven by hydraulics. Further, the de-stemmer (19) can also be driven by hydraulic power. In some embodiments, the hydraulics are provided by a hydraulic pump separate to the collection trailer (not shown), such as a hydraulic pump on a towing vehicle.

The description provided herein is in relation to several embodiments which may share common characteristics and features. It is to be understood that one or more features of one embodiment may be combinable with one or more features of the other embodiments. In addition, a single feature or combination of features of the embodiments may constitute additional embodiments.

Those skilled in the art will appreciate that the invention described herein is susceptible to variations and modifications other than those specifically described. It is to be understood that the invention includes all such variations and modifications. The invention also includes all of the features referred to, or indicated, in this specification, individually or collectively, and any and all combinations of any two or more of the features. Various alterations, additions and/or modifications may be made to the parts specifically described, without departing from the ambit of the present invention.

Also, it is to be noted that, as used herein, the singular forms "a", "an" and "the" include plural aspects unless the context already dictates otherwise.

The invention claimed is:

1. An apparatus, configured to be fitted to a collection unit, for separating berries from other plant matter from harvested plant material, the apparatus comprising:
a first separating conveyor system comprising an array of rollers, rotatable to convey harvested plant material in an upstream to downstream direction, the rollers spaced apart to form a plurality of openings therebetween permitting the transit of separated berries therethrough while preventing the transit of other plant matter;
a second separating conveyor system located in vertical axial alignment with the first separating conveyor system and comprising a continuous belt mounted to rotate around an upstream shaft and a downstream shaft, the second separating conveyor system positioned below the first separating conveyor system, the continuous belt of the second conveyor system including a plurality of openings configured to permit the transit of berries therethrough while retaining other plant matter on the continuous belt, wherein the first and second separating conveyor systems are arranged such that berries and other plant matter from the first conveyor system are deposited onto the second conveyor system, and
a destemmer positioned above the second separating conveyor system downstream of the first separating conveyor system,
wherein:
the first separating conveyor system comprises a series of shafts, each shaft including a plurality of spaced apart radially-extending rollers, wherein the shafts are spaced along a plane at an orientation and distance relative to one or more adjacent shafts such that a radially-extending roller on a shaft extends into a space between two adjacent radially-extending rollers on an adjacent shaft to provide an array of rollers and a plurality of openings,
the radially-extending rollers comprise multiple projections, radially-extending from the shaft to define the roller, wherein the radially-extending rollers are disposed perpendicular to the shaft, and
the radially-extending projections extend from the shaft in an arc away from the direction of rotation of the radially-extending rollers.

2. The apparatus of claim 1, wherein the apparatus is fitted to a collection unit.

3. An apparatus, configured to be fitted to a collection unit, for separating berries from other plant matter from harvested plant material, the apparatus comprising:
a first separating conveyor system comprising an array of rollers, rotatable to convey harvested plant material in an upstream to downstream direction, the rollers spaced apart to form a plurality of openings therebetween permitting the transit of separated berries therethrough while preventing the transit of other plant matter;
a second separating conveyor system located in vertical axial alignment with the first separating conveyor system and comprising a continuous belt mounted to rotate around an upstream shaft and a downstream shaft, the second separating conveyor system positioned below the first separating conveyor system, the continuous belt of the second conveyor system including a plurality of openings configured to permit the transit of berries therethrough while retaining other plant matter on the continuous belt, wherein the first and second separating conveyor systems are arranged such that berries and other plant matter from the first conveyor system are deposited onto the second conveyor system, and
a destemmer positioned above the second separating conveyor system downstream of the first separating conveyor system
wherein the first separating conveyor system is inclined at an angle of between 10 and 30 degrees relative to horizontal.

4. The apparatus of claim 3, wherein the first separating conveyor system is inclined at an angle of between 15 and 25 degrees relative to horizontal.

5. The apparatus of claim 3, wherein the first separating conveyor system is inclined at an angle of between 18 and 22 degrees relative to horizontal.

6. The apparatus of claim 3, wherein the first separating conveyor system is inclined at an angle of about 20 degrees relative to horizontal.

7. The apparatus of claim 1, wherein the continuous belt of the second separating conveyor system is a continuous mesh belt or a continuous grate belt providing the plurality of openings.

8. The apparatus of claim 1, wherein, when fitted to a collection unit, the downstream end of the second separating conveyor system extends beyond the unit thereby transporting other plant matter beyond the collection unit.

9. The apparatus of claim 1, when fitted to a collection unit, wherein the first and second separating conveyor systems are positioned vertically above the collection unit such that berries which transit through the openings are collected in the collection unit.

10. The apparatus of claim 1, when fitted to a collection unit, wherein the second separating conveyor system is positioned above a collection unit and the first separating conveyor system is positioned above the second separating conveyor system, such that berries or other plant matter that pass through the first separating conveyor system can interact with the second separating conveyor system.

11. The apparatus of claim 1, wherein the de-stemming unit comprises a series of rotating fingers, provided on a shaft, which rotate to dislodge the berries from other plant matter.

12. The apparatus of claim 11, wherein the rotating fingers are positioned above the second separating conveyor and rotate in the same direction as the second separating conveyor system.

13. A trailing collection unit, including a frame, a collection bin, and an apparatus for separating berries from other plant matter from harvested plant material of claim 1, wherein the apparatus is mounted above the collection bin.

14. The trailing collection unit according to claim 13, wherein the apparatus extends longitudinally along the collection unit, with the longitudinal axis of the apparatus extending along at least a portion of the length of the collection unit.

15. The trailing collection unit according to claim 13, wherein the downstream end of the second separating conveyor system extends beyond the periphery of the collection bin.

16. The apparatus of claim 1, further comprising a hopper for receiving harvested plant material and directing it to an upstream portion of the first separating conveyor system.

17. A method for separating berries from other plant matter from harvested plant material, the method comprising
   providing an apparatus of claim 1;
   providing a hopper positioned above the first separating conveyer system of the apparatus;
   providing a collection unit below the second separating conveyer system of the apparatus;
   wherein the hopper receives harvested plant material and directs it to an upstream end of the first separating conveyor system of the apparatus; and
   wherein the first and second separating conveyor systems of the apparatus are arranged such that berries and other plant matter from the first conveyor system are deposited onto the second conveyor system that conveys harvested plant material in an upstream to downstream direction and permits the transit of separated berries therethrough while preventing the transit of other plant matter, such that berries that pass through the second conveyer system are collected by the collection unit.

18. The apparatus of claim 1, wherein a longitudinal axis of the first separating conveyor system and a longitudinal axis of the second separating conveyor systems are parallel to each other.

\* \* \* \* \*